W. J. C. GAAR.
Sewing-Machine Casters.

No. 151,018. Patented May 19, 1874.

WITNESSES:

INVENTOR:
BY
ATTORNEYS.

UNITED STATES PATENT OFFICE.

WILLIAM J. C. GAAR, OF WHITESBURG, GEORGIA.

IMPROVEMENT IN SEWING-MACHINE CASTERS.

Specification forming part of Letters Patent No. 151,018, dated May 19, 1874; application filed January 17, 1874.

*To all whom it may concern:*

Be it known that I, WILLIAM J. C. GAAR, of Whitesburg, in the county of Carroll and State of Georgia, have invented a new and Improved Sewing-Machine Caster, of which the following is a specification:

This invention consists of a rock-shaft on each end standard or frame of the stand, near the bottom, at right angles to the treadle-shaft, and carrying a caster in the outer end of an arm near each end, the said rock-shaft being connected by another arm and a rod with a lever pivoted on the treadle next to the standard, so as to force the casters down and raise the stand upon them when the free end is pressed down by the foot or hand of the operator. When forced down the lever drops under a stud-catch on the standard, which holds down and keeps the stand mounted on the casters.

Figure 1:
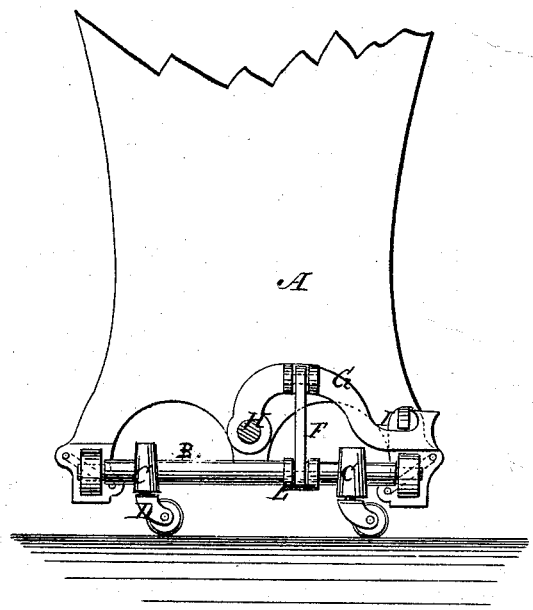
Figure 2:
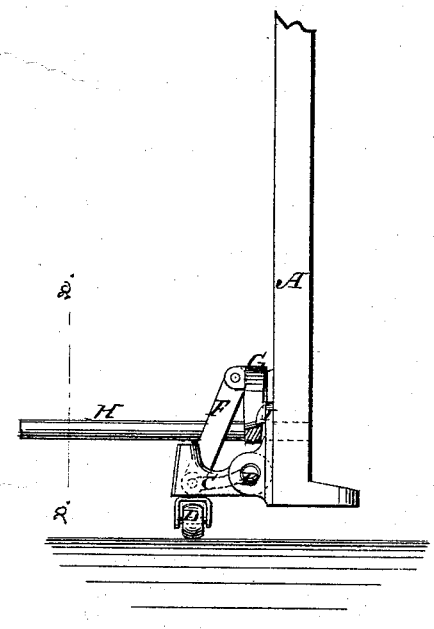

Figure 1 is a side elevation of part of one of the standards of the sewing-machine frame, and a section of the treadle-shaft on the line $x\,x$ of Fig. 2. Fig. 2 is a front elevation of Fig. 1.

Similar letters of reference indicate corresponding parts.

A is the standard for one end of the sewing-machine table. B is the rock-shaft, mounted on it inside, in suitable bearings, a little above the lower end, and extending the whole breadth or from front to rear of said standard. This rock-shaft has a horizontal arm, C, near each end, in the outer end of which is a caster-wheel, D. It also has another arm, E, which is connected, by a rod, F, with a lever, G, pivoted on the foot-treadle H, and ranging at its free end up and down along the front edge of the standard.

When these levers are pressed down by the feet of the operator or otherwise, and fastened by the stud-catches I, they force the casters down, and lift the standards A off the floor onto them, as represented in the drawing, and when they are released from said catches they allow the standards to fall onto the floor.

Having thus described my invention, I claim as new and desire to secure by Letters Patent—

The combination of the rock-shafts B, horizontal arms C, casters D, arms E, connecting-rods F, levers G, and stud-catches I, with the standard A and the treadle-shaft H of a sewing-machine stand, substantially as specified.

WILLIAM J. C. GAAR.

Witnesses:
H. M. NEWTON,
J. D. MOORE, Jr.